United States Patent
Enderby

(10) Patent No.: US 7,796,583 B1
(45) Date of Patent: Sep. 14, 2010

(54) PACKET HANDLER FOR HIGH-SPEED DATA NETWORKS

(75) Inventor: Russell T. Enderby, Suwanee, GA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 2211 days.

(21) Appl. No.: 10/196,884

(22) Filed: Jul. 17, 2002

(51) Int. Cl.
*H04L 12/66* (2006.01)

(52) U.S. Cl. .................. 370/353; 370/356; 370/412; 370/413; 725/106

(58) Field of Classification Search ............. 370/353, 370/356, 412, 413; 725/106
See application file for complete search history.

(56) References Cited

U.S. PATENT DOCUMENTS

| 4,991,172 | A  | * | 2/1991 | Cidon et al. | ........... | 370/400 |
| 7,388,884 | B2 | * | 6/2008 | Bunn et al.  | ........... | 370/474 |
| 2002/0162116 | A1 | * | 10/2002 | Read et al. | ........... | 725/106 |
| 2007/0242693 | A1 | * | 10/2007 | Limb et al. | ........... | 370/465 |

* cited by examiner

*Primary Examiner*—Quynh H Nguyen
(74) *Attorney, Agent, or Firm*—Christopher & Weisberg, P.A.

(57) ABSTRACT

An improved packet handler for VoIP cable modems and other high-speed digital devices includes a direct communication link via hardware among internal processing components. Incoming and outgoing digital information packets are filtered into MAC packets, voice PDU packets, and non-voice PDU packets, such that priority can be given to relaying voice packets and minimizing potential voice delay within the cable network. Hardware components, including specialized logic circuitry, modify voice packets to an appropriate signal form for subsequent signal processing or signal transmission. Proprietary bus communication protocols can also be provided to facilitate relay of packets between a central processing unit (CPU) and a digital signal processor (DSP) within a VoIP cable modem. Line cards including subscriber line interface circuit (SLIC) and subscriber line audio processing circuit (SLAC) components provide analog-to-digital (A/D) and digital-to-analog (D/A) conversion functionality.

17 Claims, 4 Drawing Sheets

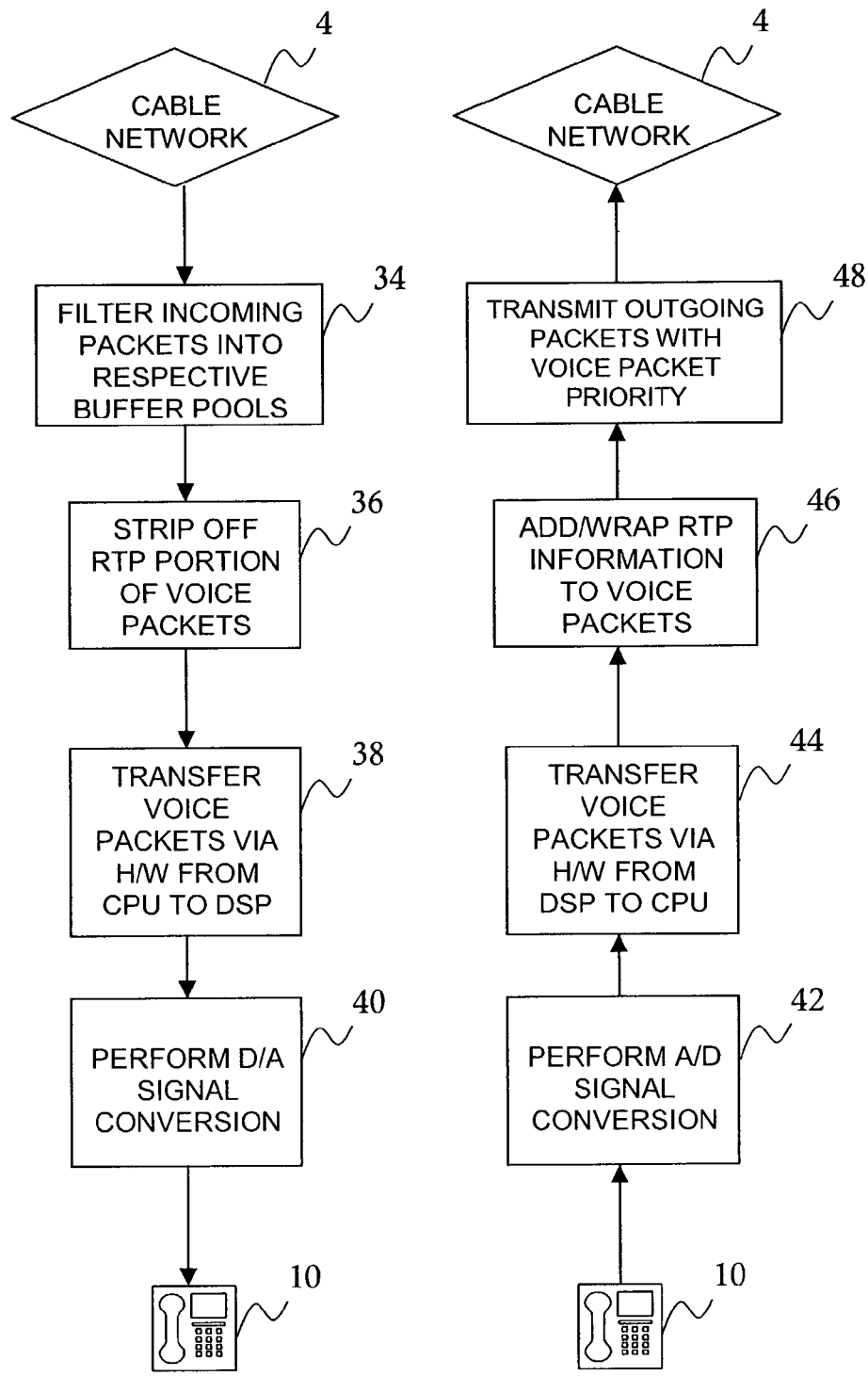
*Figure 4A*   *Figure 4B*

PACKET HANDLER FOR HIGH-SPEED DATA NETWORKS

FIELD OF THE INVENTION

The present invention generally relates to packet routing for Voice over Internet Protocol (VoIP) applications, and more particularly relates to a high-speed packet handler for providing a direct hardware link to and from the digital signal processor (DSP) of a VoIP cable modem.

BACKGROUND OF THE INVENTION

In accordance with the modern digital era and present need for fast and efficient means of relaying information, the telecommunications industry has provided many significant technological advancements. Currently, many residential and commercial locations worldwide utilize some sort of high-speed data network for transmitting and receiving different types of digital information. For example, many homes today often employ a high-speed cable modem or digital subscriber line (DSL) link for connecting to the internet, receiving cable television service, and/or implementing other communication applications that employ digital signal configurations.

Given the more prevalent availability of such high-speed data networks at residential and commercial locations, VoIP technology has been developed to apply the benefits of high-speed digital data transfer to existing telephony applications. Current communication via telephone networks employs analog signal transmission, and thus conversion from analog to digital communication offers many potential benefits including increased signal clarity and reduced signal interference.

In order to utilize high-speed data networks for voice receipt and transmission, hardware must be provided at each end location to implement analog-to-digital (A/D) and digital-to-analog (D/A) signal conversion. By providing such conversion hardware, signals can be transmitted from a cable modem termination system (CMTS) or other front end of a network service provider to various end locations. Once digital signals are received at each end location, D/A conversion enables a user to hear the analog voice signal at a telephone handset. Similarly, an analog voice signal provided by a user can be converted to a digital signal at the end location and then transmitted digitally over the high-speed data network to a desired destination.

For high-speed cable networks, the hardware required at each end location typically includes at least a cable modem and appropriate signal interface. For such high-speed networks that also provide VoIP capabilities, additional hardware must be provided in a specialized cable modem, such as a Touchstone brand telephony modem as offered for sale by Arris Corp. Such VoIP cable modems may be provided as a "black box" type structure on the outside of a house or other end location. Conventional VoIP cable modem embodiments preferably include a central processing unit (CPU) with various hardware and software components, a digital signal processor (DSP), and a line card with A/D and D/A conversion functionality.

Certain performance characteristics such as speed, efficiency, and signal quality are inherently part of preferred modem design criteria. As a result, signal routing among the components of a VoIP cable modem or other high-speed data interface is critical to the performance of VoIP applications. In conventional VoIP cable modem embodiments, data packets received by the CPU from a high-speed transmission medium are sorted and routed via software to the DSP component. However, implementation of software routing protocols often requires a significant amount of valuable CPU clock cycle time as well as CPU power. Thus, improvements in signal routing within cable modems having VoIP telephony functionality are highly desirable.

BRIEF SUMMARY OF THE INVENTION

Objects and advantages of the invention will be set forth in part in the following description, or may be obvious from the description, or may be learned through practice of the invention. The present subject matter recognizes and addresses various drawbacks and other shortcomings related to signal routing in certain conventional VoIP cable modems. Thus, the presently disclosed technology is directed to an improved system and method for handling information packets within a cable modem having IP telephony functionality. More particularly, the system and method relate to the transfer of information among various processing components of a VoIP cable modem.

Although having particular usefulness for cable modems, it should be appreciated that the present invention is not limited to this use. Aspects of the invention may be used with other devices or in environments other than a cable network. Such uses may be known or become apparent to those skilled in the art and are within the spirit and scope of the invention. For illustrative purposes, embodiments of the disclosed technology according to the invention may be explained herein as they relate to a cable modem.

Aspects of the present subject matter concern a hardware solution for routing data packets to and from a digital signal processor (DSP) within a cable modem. A system and method for providing such functionality via hardware offers many advantages over conventional software routing protocols. In general, aspects of the present subject matter are characterized as relatively inexpensive, efficient, and effective.

A particular advantage of aspects of the present subject matter corresponds to providing a packet handling protocol that will improve the voice delay time within a cable network and corresponding cable modem component.

Yet another advantage of aspects of the subject packet routing protocol is that the number of clock cycles used in a cable modem's central processing unit to route selected data packets is reduced as compared to disclosed conventional routing methods. Reduced clock cycle count generally corresponds to an additional reduction in the amount of power needed for proper component operation.

Exemplary embodiments of the disclosed technology generally provide for packet routing methodology within a cable modem or other high-speed data network interface component. Digital information packets are received by a cable modem and sorted into different packet types, including management packets, voice data packets, and non-voice data packets. Once identified, different types of packets can then be provided to respective packet buffer pools in the cable modem hardware. By appropriately characterizing certain digital information packets as voice packets, the voice packets can be given priority over other packets and routed in accordance with the present technology such that potential voice delay over a cable network is reduced. An exemplary sorting means for identifying packet types and providing different data types to respective buffer pools may correspond to hardware or software components of a central processing unit (CPU) within a specialized cable modem.

Once a data packet is recognized as a voice packet, additional hardware components may then strip portions of the packet corresponding to real time protocol (RTP) information and determine an appropriate port for mapping the modified voice packet from the cable modem's CPU to a digital signal processor (DSP) channel. Hardware means for modifying voice data packets in such a fashion may correspond to a specialized logic circuit, such as an application specific integrated circuit (ASIC) or field programmable gate array (FPGA). Such logic circuitry combined with hardware registers within the CPU can also store transfer location information for the CPU data ports and corresponding DSP channels among which voice packets are relayed.

In accordance with additional aspects of the present technology, processing of the voice data may also occur within the cable modem. Such processing may occur within the DSP component itself, or within a subsequent line card component. An exemplary line card contains a subscriber line interface circuit (SLIC) and a subscriber line audio processing interface for converting voice data between digital and analog signal formats.

It should be appreciated that the aforementioned exemplary features and steps related to DSP packet handling should not be limited to incoming voice packets, but are readily applicable to both incoming and outgoing voice data packets. In accordance with such two-way packet transfer, an outgoing voice packet can be converted from an analog to a digital signal, for example, via line card component, and then routed to the DSP. When the DSP hardware contains outgoing voice packets, it can interrupt the CPU (or alternatively by polled by the CPU) and packets can be transferred via hardware as described above. Specialized logic circuitry similar to that used to strip RTP packet information could be employed to add RTP information to a packet making it suitable for transmission over the high-speed data network.

Other aspects and features of the present subject matter will become apparent to those ordinarily skilled in the art upon review of the following description of specific embodiments of the invention in conjunction with the accompanying figures.

BRIEF DESCRIPTION OF THE DRAWINGS

The above and other aspects, features, and advantages of the present subject matter will be more apparent from the following more particular description of particular embodiments of the invention as set forth in the appended figures, in which:

FIG. 4A provides a block diagram of exemplary VoIP signal routing methodology for incoming packets in accordance with the disclosed technology; and FIG. 4B provides a block diagram of exemplary VoIP signal routing methodology for outgoing packets in accordance with the disclosed technology.

Figure 1:
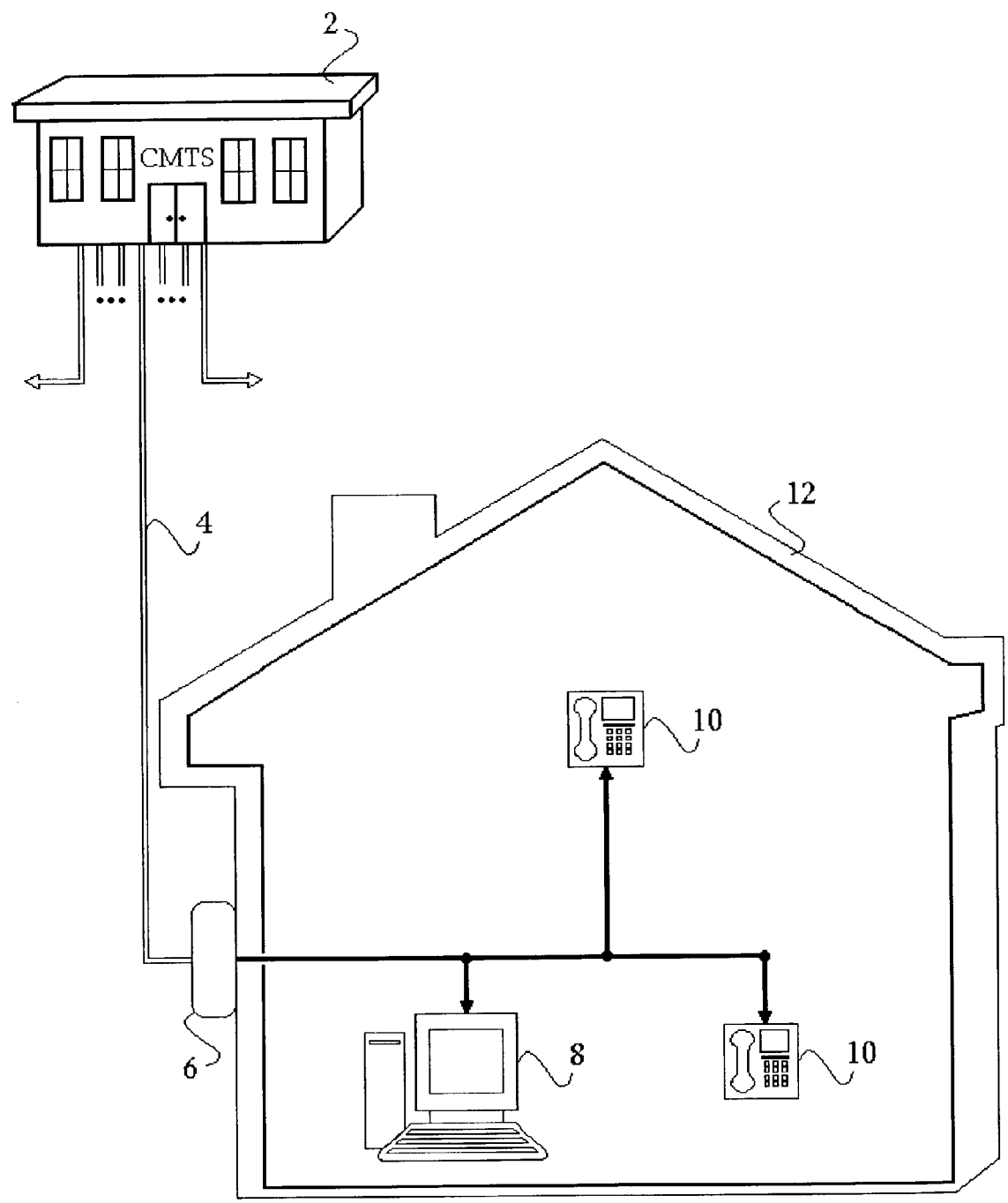
FIG. 1 illustrates an exemplary high-speed cable communication network in accordance with aspects of the present subject matter.

Repeat use of reference characters throughout the present specification and appended drawings is intended to represent same or analogous features or elements of the presently disclosed technology.

DETAILED DESCRIPTION

Reference will now be made in detail to embodiments of the invention, one or more examples of which are illustrated in the figures. The embodiments are provided by way of explanation of the invention, and not as a limitation of the invention. For example, features illustrated or described as part of one embodiment may be used with another embodiment to yield a still further embodiment. These and various other modifications and variations may be made to the embodiments set forth herein without departing from the spirit and scope of the invention.

As mentioned, embodiments of the invention are particularly useful in the high-speed cable modem industry, although the invention is not limited to such use. The invention may have application in any industry or environment wherein it is necessary or desirable to provide fast and effective systems and corresponding methodology for routing data packets among processing components. For purposes of explaining certain aspects of the invention, reference is made to embodiments of the invention particularly configured for cable modem components, and more particularly to cable modems with IP telephony functionality (VoIP cable modems.)

With reference to FIG. 1, a simple illustration is presented of a high-speed cable communication network. A network service provider has a Cable Modem Termination System (CMTS) 2 defining a "front" or "head" end connection site defining a central node in a cable network. Appropriate digital signal transmission medium 4, including but not limited to copper cable coax, optical fiber, or wireless transmission links, connect CMTS network node 2 with various end locations within the cable network. End locations could correspond to structures such as residential dwellings, commercial or business structures, etc.

An exemplary end location 12 as depicted in FIG. 1, is provided with a Customer Premised Equipment (CPE) device 6 that acts as an interface between the network and the various functional devices within the structure, such as computer 8, phones 10, etc. Thus, CPE 6 comprises a device that interfaces between data signals relayed via transmission medium 4 and applications such as digital cable, high-speed internet and IP telephony. In the illustrated embodiment, the cable network provides VoIP capability and the CPE 6 is thus a VoIP cable modem. Such features are well known and understood by those skilled in the art and a detailed explanation thereof is not necessary for an understanding of the invention.

The digital information relayed via transmission cables 4 to an end location often include a variety of different types of information, referred to as data packets. For example, conventional digital data comprises information packets to manage the flow of information (management packets), such as Media Access Control (MAC) packets, as well as actual data information, such as contained in Packet Data Unit (PDU) packets. PDU packets contain the signals that are relayed regarding desired internet information, a present phone conversation, a selected television show, etc. Determining how to handle such incoming information packets is an important decision, and one that is addressed by aspects of the present invention. Packet handling with respect to incoming and outgoing digital data is typically addressed within a cable modem, and thus the disclosed technology is presented with regards to packet handling in a VoIP cable modem.

Figure 2:
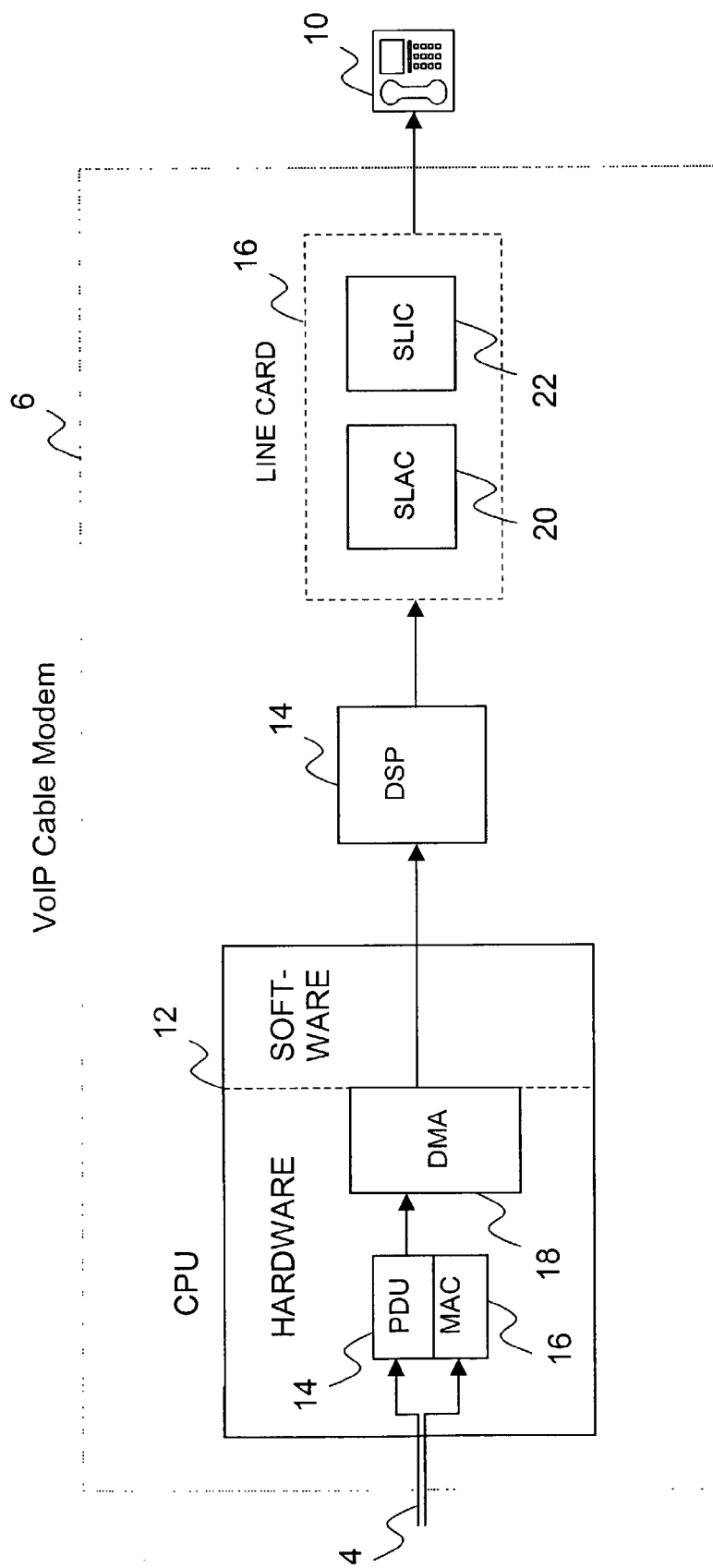
FIG. 2 provides a block diagram illustrating an exemplary known VoIP cable modem configuration for use with a high-speed cable communication network.

FIG. 2 illustrates an exemplary conventional VoIP cable modem. There are typically many internal components of a VoIP cable modem, including a central processing unit (CPU) 12, a digital signal processor (DSP) 14, and a line card 16. Digital information is received via transmission medium 4, and provided to the cable modem 6, where CPU 12 provides functionality to determine what type of packets are received or transmitted. This can be determined in software by looking at the Ethernet-configured information within a packet header. By identifying the type of information, packets can then be sorted into different groups and provided to respective buffer pools within CPU 12. For example, in accordance with known packet routing techniques, incoming information is filtered into either a PDU packet buffer pool 14 or a MAC packet buffer pool 16. Packets in this PDU buffer pool include both voice data packets and non-voice data packets. However, it is typically desired to give priority to voice data packets over other data packets in order to minimize voice delays.

Continuing with the known system and method of FIG. 2, once it is determined that an incoming data packet is a voice packet, that information is provided to a direct memory access (DMA) location 18 within the hardware of CPU 12. Once a packet is in DMA 18, CPU software routines are interrupted and utilized to get the information from DMA 18 and relay it to DSP 14. Voice packets (and/or other packets as well) can then be provided from DSP 14 to line card 16. A line card may combine a Subscriber Line Interface Circuit (SLIC) 20 and a Subscriber Line Audio processing Unit (SLAC) that provide digital-to-analog (D/A) conversion for incoming voice packets and analog-to-digital (A/D) conversion for outgoing voice packets. The utilization of software to determine whether a packet is a voice packet combined with the routing procedures between CPU 12 and DSP 14 via software is sometimes an inefficient method of packet handling, and often increases the probability of voice delays in a VoIP environment. Thus, a new system and method for packet handling within a VoIP cable modem and within other potential applications has been developed as is discussed hereafter with respect to FIG. 3.

Figure 3:
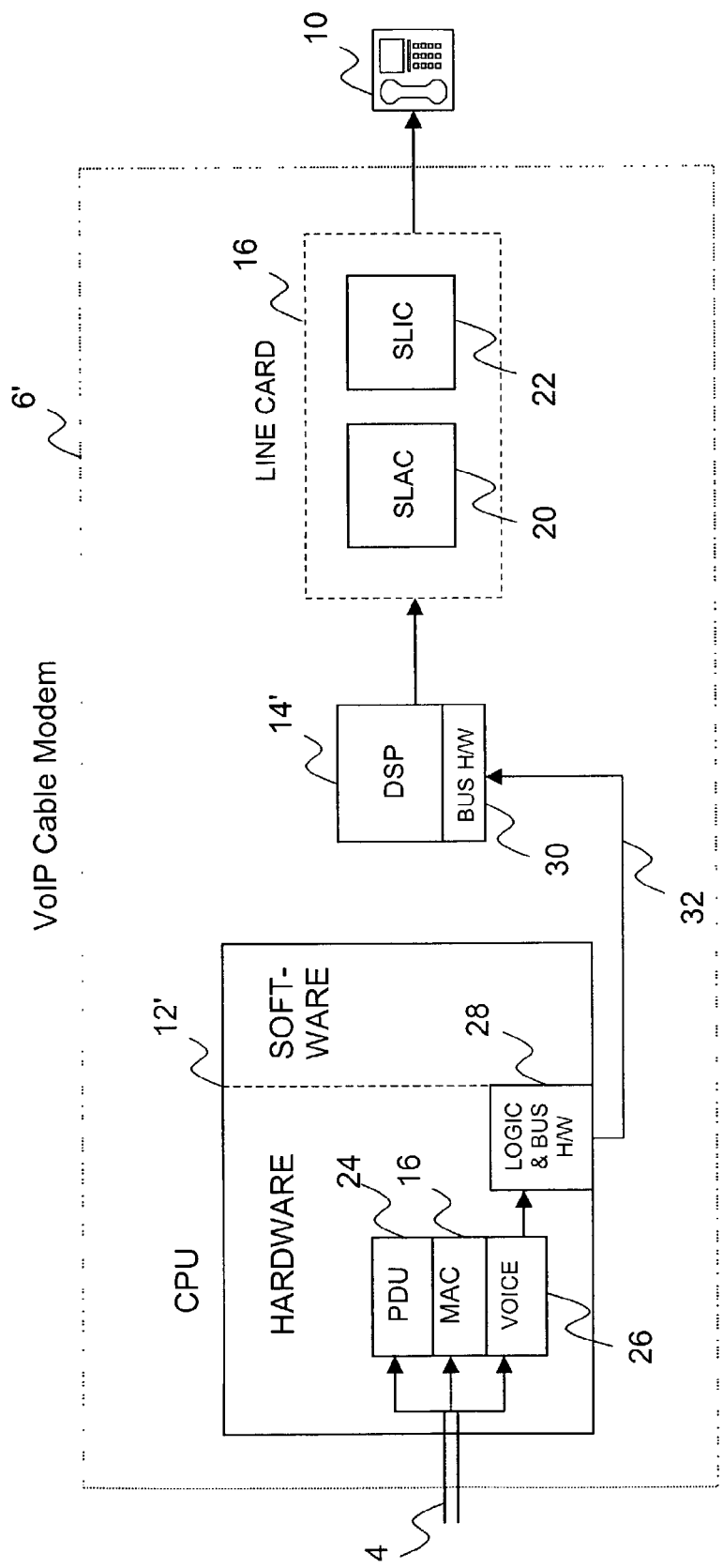
FIG. 3 illustrates an exemplary VoIP cable modem configuration in accordance with the presently disclosed technology for use with a high-speed cable communication network.

FIG. 3 illustrates an exemplary VoIP cable modem configuration in accordance with the presently disclosed technology for use with high-speed cable communication networks. Digital information is received from transmission medium 4 at VoIP cable modem 6', which includes similar features as VoIP cable modem 6 of FIG. 2 but is configured in accordance with the improved packet handling technology of the present invention. Hardware components within CPU 12' filter information and sort it by packet type into different packet buffer pools. Packets in accordance with the exemplary VoIP cable modem 6' of FIG. 3 are divided into at least three buffer pool types, corresponding respectively to MAC packets 16, non-voice PDU packets 24 and voice PDU packets 26. It is desired to relay packets in the voice PDU buffer pool as expediently as possible to minimize voice delay, and thus information in the voice PDU buffer pool 26 can receive priority over information in other buffer pools in accordance with the subject packet handling technology.

With further reference to the exemplary VoIP cable modem 6' of FIG. 3, additional hardware 28 can be provided in CPU 12' to route voice packets from CPU 12' to DSP 14'. Additional hardware 28 comprises logic circuitry for modifying voice packets from voice buffer pool 26. All incoming data packets are typically configured for Ethernet transmission with a Real Time Protocol (RTP) packet configuration. One purpose of a new hardware logic circuit is to strip off the portion of a voice packet corresponding to RTP information, such that data is modified to a form that is suitable for processing by DSP 14'. An example of a logic circuit that provides such capabilities corresponds to an application specific integrated circuit (ASIC) designed to implement the desired modification. A field programmable gate array (FPGA) or other specialized programmable logic device can also offer such desired packet modification functionality. It should be well within the purview of one of ordinary skill in the art to design an ASIC, FPGA, or other suitable logic device to carry out the desired packet modifications. The specific design of a specialized logic circuit to perform the desired packet modification typically depends on the type of packet sorting protocol that is utilized in the cable modem CPU as well as the particular signal configurations employed throughout the packet routing procedure.

Hardware components can then also determine the port location within CPU 12' that would map to a desired channel of DSP 14' so that the voice data packets can be routed appropriately. Such transfer information can be programmed into hardware registers during initialization of VoIP cable modem 6'. Utilizing protocol information inherent to the configuration of DSP 14', the hardware forwards the voice packets via a direct hardware communication route. The actual transfer of information from CPU 12' to DSP 14' can be accomplished in a variety of particular fashions. For example, a protocol to serially transmit or "bit bang" information between the two components can be employed. Alternatively, proprietary bus communication protocol modules may be provided in both the new hardware 28 of CPU 12' and in bus protocol module 30 of DSP 14'. Such proprietary bus protocol modules transform the packet data into an appropriate form for relaying the packet data over a communications bus provided between CPU 12' and DSP 14'.

Once the DSP 14' receives an incoming voice packet from CPU 12', additional processing may then occur to the voice data before it is sent from DSP 14' to line card 16. The internal components of line card 16 convert the voice data from digital to analog format such that the voice information is provided as a quality audio signal at an audio module, such as phone 10, at a given end location.

In accordance with the disclosed technology, it should be appreciated that the methodology presented with respect to incoming voice and other information packets can also be applied to handling outgoing information packets as well. When an analog voice signal is provided at phone 10 or other end location audio module, line card 16 converts the analog voice signal to digital format and then relays the voice packet to DSP 14'. At this point, the hardware in CPU 12' can be interrupted so that the voice packets can be provided thereto. Alternatively, CPU 12' can poll DSP 14' at given intervals to determine if any outgoing voice packets are available. At this point, CPU hardware would get the voice packet and utilize its specialized logic circuitry to wrap the packet with information corresponding to RTP formats and to ensure compatibility with TCP/IP (Transmission Control Protocol with Internet Protocol) signal transmission, and then transmit the voice packet over data transmission medium 4 to its desired destination.

In accordance with the subject direct hardware communication route and packet handling system, FIGS. 4A and 4B provide exemplary respective procedures for routing digital information within a cable modem and associated cable network.

FIG. 4A displays exemplary steps that can be utilized to route incoming information packets between cable network (and corresponding transmission medium 4) and an end location's telephone 10 or other suitable audio module. A first step 34 in exemplary routing process of FIG. 4A corresponds to receiving incoming digital information from cable network 4 and filtering the information into different packet types. Voice data packets are provided to a voice data packet buffer pool, and additional filtering may occur among non-voice PDU packets and MAC packets. A second step 36 of routing incoming voice packets corresponds to stripping information from the voice packets corresponding to RTP information. Subsequent step 38 corresponds to transferring the voice data modified in step 36 from CPU to DSP components within a VoIP cable modem. The transfer of step 38 is effected via hardware in accordance with the disclosed technology. A final step before providing voice data to telephone 10 is to convert the signal from digital to analog format.

FIG. 4B displays exemplary steps that can be utilized to route outgoing information packets between an end location's telephone 10 or other suitable audio module and a cable network (and corresponding transmission medium 4.) A first step 40 is to convert the analog voice signal provided at telephone 10 to digital format. Additional processing may be done to the digital signal before step 44 at which point the digital data is transferred from DSP to CPU components via hardware in accordance with the disclosed technology. At step 46, RTP information is added/wrapped to the voice information to form voice data packets capable of transmission over the cable network 4. Finally, step 48 corresponds to transmitting the outgoing packets with a relay system that generally gives priority to outgoing voice packets over other outgoing information packets.

While the invention herein disclosed has been described by means of specific embodiments, numerous modifications and variations could be made thereto by those skilled in the art without departing from the scope of the invention set forth in the claims. Accordingly, the scope of the present subject matter should be assessed as that of the disclosed variation of embodiments and any equivalents thereto.

What is claimed is:

1. A cable modem for use with Voice over Internet Protocol (VoIP) applications, comprising:
   a central processing unit (CPU) for:
      receiving a plurality of digital information packets including management packets, non-voice data packets and voice packets; and
      sorting the management packets, the non-voice data packets, and the voice packets into a corresponding management packets buffer pool, a non-voice data packets buffer pool, and a voice packets buffer pool, the management packets buffer pool, the non-voice data packets buffer pool, and the voice packets buffer pool being separate from each other;
   a logic circuit, the logic circuit receiving the voice packets from the voice packets buffer pool and modifying only the voice packets to include stripping off protocol information; and
   a digital signal processor (DSP) interfaced with said CPU via a communications bus, the DSP processing the modified voice packets received by the CPU prior to processing management packets and non-voice data packets;
   the logic circuit relaying the modified voice packets directly from the CPU to the DSP via the communications bus.

2. A cable modem as in claim 1, wherein said logic circuit comprises an application specific integrated circuit (ASIC) that strips off the protocol information, including real-time protocol (RTP) information, from the voice packets before relaying the voice packet to said DSP.

3. A cable modem as in claim 1, further comprising bus communication protocol modules at said CPU and said DSP, said protocol modules transforming the voice packets into an appropriate signal form for relaying the voice packets over the communications bus.

4. A cable modem as in claim 1, further comprising a line card connected to said DSP, said line card converting digital voice packets processed by said DSP into analog voice signals.

5. A cable modem as in claim 4, wherein said line card comprises a subscriber line interface circuit (SLIC) and a subscriber line audio processing interface (SLAC).

6. A cable modem as in claim 1, wherein said cable modem is configured within a data network such that said cable modem transmits and receives digital voice signals from a cable modem termination system and analog voice signals from audio modules at various end locations.

7. A cable modem as in claim 6, wherein said logic circuit comprises an application specific integrated circuit (ASIC) that strips off the protocol information, including Real Time Protocol (RTP) information, from the voice packets before relaying the voice packets to said DSP.

8. A cable modem as in claim 6, further comprising bus communication protocol modules at said CPU and said DSP, said bus communication protocol modules transforming the voice packets into an appropriate signal form for relaying the voice packets over the communications bus.

9. A cable modem as in claim 6, further comprising a line card connected to said DSP, said line card converting digital voice packets processed by said DSP into analog voice signals.

10. A cable modem as in claim 9, wherein said line card comprises a Subscriber Line Interface Circuit (SLIC) and a Subscriber Line Audio proCessing interface (SLAC).

11. A packet handler for digital data applications, said packet handler comprising:
   sorting means for identifying a plurality of digital information packets received from a digital signal transmission medium as one of management packets, non-voice data packets, and voice packets and for sorting the management packets, the non-voice data packets, and the voice packets into a corresponding management packets buffer pool, a non-voice data packets buffer pool and a voice packets buffer pool, the management packets buffer pool, the non-voice data packets buffer pool and the voice packets buffer pool being separate from each other;
   hardware means for receiving the voice packets from the voice packets buffer pool and modifying only the voice packets to include stripping off protocol information for further transmission and processing; and
   processing means interfaced with said hardware means for processing the modified voice packets from said hardware means prior to processing the management packets and the non-voice data packets, and for converting the modified voice packets into analog signal format.

12. A packet handler as in claim 11, wherein said hardware means comprises circuitry for stripping the protocol information, including Real Time Protocol (RTP) information, from the voice packets received from the voice packets buffer pool.

13. A packet handler as in claim 12, wherein said processing means for converting modified voice packets into analog signal format comprises a Subscriber Line Interface Circuit (SLIC) and a Subscriber Line Audio proCessing interface (SLAC).

14. A method for routing digital information packets, said method comprising:

receiving a plurality of information packets from a digital signal transmission medium, wherein the plurality of information packets are provided in accordance with a real time protocol (RTP) configuration, the plurality of information packets including management packets, non-voice data packets and voice packets;

sorting the management packets, the non-voice data packets, and the voice packets into a corresponding management packets buffer pool, a non-voice data packets buffer pool, and a voice packets buffer pool, the management packets buffer pool, the non-voice data packets buffer pool and the voice packets buffer pool being separate from each other;

modifying only the voice packets to include stripping off protocol information; and routing the voice packets directly from a central processing unit to a digital signal processor within a cable modem prior to relaying management packets and non-voice data packets.

15. A method for routing digital information packets as in claim 14, further comprising the step of converting between digital information communicated over the digital signal transmission medium and analog information relayed to and from an end location audio module.

16. A method for routing digital information packets as in claim 14, wherein stripping off protocol information includes removing real time protocol (RTP) information from voice packets before step routing the voice packets.

17. A method for routing digital information packets, said method comprising the following steps:

utilizing logic circuitry to determine a presence of management packets, non-voice data packets and voice packets;

sending an interrupt signal from a digital signal processor to a central processing unit upon detecting the voice packets;

modifying the voice packets to include real time protocol (RTP) information;

transmitting only the voice packets directly from the digital signal processor to the central processing unit an initial step of converting the voice packets from analog information provided by an end location audio module to digital information for communication over the digital data network; and providing communications protocols within both the central processing unit and the digital signal processor and providing a communications bus for relaying digital information packets between the central processing unit and the digital signal processor.

* * * * *